(12) United States Patent
Nanno et al.

(10) Patent No.: US 10,968,872 B2
(45) Date of Patent: Apr. 6, 2021

(54) EXHAUST GAS RECIRCULATION VALVE WARMING DEVICE

(71) Applicant: TOYOTA JIDOSHA KABUSHIKI KAISHA, Toyota (JP)

(72) Inventors: Keishi Nanno, Nagoya (JP); Koichi Nishitani, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/804,621

(22) Filed: Feb. 28, 2020

(65) Prior Publication Data

US 2020/0300199 A1    Sep. 24, 2020

(30) Foreign Application Priority Data

Mar. 18, 2019  (JP) .............................. JP2019-049575

(51) Int. Cl.
| | |
|---|---|
| *F02M 26/73* | (2016.01) |
| *F02M 35/10* | (2006.01) |
| *F02M 26/53* | (2016.01) |
| *F02M 26/30* | (2016.01) |
| *F01P 7/14* | (2006.01) |

(Continued)

(52) U.S. Cl.
CPC ............... *F02M 26/73* (2016.02); *F01P 7/14* (2013.01); *F02D 41/0065* (2013.01); *F02M 26/23* (2016.02); *F02M 26/30* (2016.02); *F02M 26/50* (2016.02); *F02M 26/53* (2016.02); *F02M 35/10222* (2013.01); *F01P 2007/146* (2013.01); *F02D 2041/0067* (2013.01); *F02M 26/16* (2016.02); *F02M 26/33* (2016.02)

(58) Field of Classification Search
CPC ...................................................... F02M 26/73
See application file for complete search history.

(56) References Cited

U.S. PATENT DOCUMENTS 5,769,390 A * 6/1998 Ando ..................... F16K 31/046
                                                           251/129.05
6,568,356 B1 * 5/2003 Hayakawa .............. F01P 7/167
                                                           123/41.1

(Continued)

FOREIGN PATENT DOCUMENTS

| JP | 2013-53558 A | 3/2013 |
|---|---|---|
| JP | 2015-178777 A | 10/2015 |
| WO | 2015/141756 A1 | 9/2015 |

*Primary Examiner* — Kevin R Steckbauer
(74) *Attorney, Agent, or Firm* — Oliff PLC (57) ABSTRACT

An exhaust gas recirculation valve warming device includes an exhaust throttle arranged in an exhaust passage, an exhaust gas recirculation passage that extends from a portion of the exhaust passage that is upstream of the exhaust throttle and is connected to an intake passage, an exhaust gas recirculation valve arranged in the exhaust gas recirculation passage, and a branch passage that extends from a portion of the exhaust gas recirculation passage that is upstream of the exhaust gas recirculation valve in a direction in which exhaust gas flows, in which the branch passage is connected to a portion of the exhaust passage that is downstream of the exhaust throttle. The exhaust gas recirculation valve includes a valve passage that forms part of the exhaust gas recirculation passage and a warming passage that forms part of the branch passage.

7 Claims, 3 Drawing Sheets

(51) Int. Cl.
*F02D 41/00* (2006.01)
*F02M 26/50* (2016.01)
*F02M 26/23* (2016.01)
*F02M 26/16* (2016.01)
*F02M 26/33* (2016.01)

(56) References Cited

U.S. PATENT DOCUMENTS

| | | | | |
|---|---|---|---|---|
| 6,631,707 | B1* | 10/2003 | Bender | F02M 26/73 |
| | | | | 123/568.11 |
| 6,647,971 | B2* | 11/2003 | Vaughan | F02M 26/73 |
| | | | | 123/568.12 |
| 6,662,789 | B1* | 12/2003 | Hatano | F02M 26/73 |
| | | | | 123/41.31 |
| 6,708,675 | B2* | 3/2004 | Kato | F02B 47/08 |
| | | | | 123/568.12 |
| 7,168,682 | B2* | 1/2007 | Nanba | F02M 26/50 |
| | | | | 251/305 |
| 7,234,444 | B2* | 6/2007 | Nanba | F02M 26/50 |
| | | | | 123/337 |
| 7,455,056 | B2* | 11/2008 | Seiyama | F01L 3/24 |
| | | | | 123/568.11 |
| 8,713,936 | B2* | 5/2014 | Joergl | F02M 26/16 |
| | | | | 60/605.2 |
| 9,062,636 | B2* | 6/2015 | Nishimori | F16K 5/201 |
| 9,341,146 | B2* | 5/2016 | Huesges | F28F 9/00 |
| 9,404,409 | B2* | 8/2016 | Pursifull | F02M 26/06 |
| 9,636,973 | B2* | 5/2017 | Pursifull | F02M 26/10 |
| 10,030,618 | B2* | 7/2018 | Miki | F02M 26/72 |
| 10,072,773 | B2* | 9/2018 | Baasch | F01P 1/00 |
| 10,161,527 | B2* | 12/2018 | Simons | F16K 27/02 |
| 10,316,801 | B2* | 6/2019 | Zhang | F02M 26/24 |
| 10,767,544 | B2* | 9/2020 | Hatsuzawa | F16C 37/007 |
| 10,774,796 | B2* | 9/2020 | Haigh | G01F 1/34 |
| 2002/0174858 | A1* | 11/2002 | Kato | F02B 47/08 |
| | | | | 123/568.12 |
| 2003/0047171 | A1* | 3/2003 | Vaughan | F02M 26/73 |
| | | | | 123/568.12 |
| 2005/0183705 | A1* | 8/2005 | Nanba | F02D 9/1045 |
| | | | | 123/568.24 |
| 2007/0095334 | A1* | 5/2007 | Nanba | F02D 9/1045 |
| | | | | 123/568.24 |
| 2007/0194260 | A1* | 8/2007 | Seiyama | F02M 26/67 |
| | | | | 251/129.15 |
| 2009/0165449 | A1* | 7/2009 | Christ | F02M 26/51 |
| | | | | 60/320 |
| 2009/0183509 | A1* | 7/2009 | Joergl | F02M 26/16 |
| | | | | 60/605.2 |
| 2011/0031426 | A1* | 2/2011 | Tyler | F02M 26/67 |
| | | | | 251/251 |
| 2012/0167862 | A1* | 7/2012 | Nishimori | F16K 5/201 |
| | | | | 123/568.12 |
| 2013/0269664 | A1* | 10/2013 | Park | F02M 26/73 |
| | | | | 123/568.29 |
| 2014/0007852 | A1* | 1/2014 | Huesges | F28F 9/00 |
| | | | | 123/568.12 |
| 2014/0190459 | A1* | 7/2014 | Horiuchi | F02M 26/18 |
| | | | | 123/568.12 |
| 2015/0121847 | A1* | 5/2015 | Pursifull | F02D 41/0077 |
| | | | | 60/274 |
| 2015/0121848 | A1* | 5/2015 | Pursifull | F01N 5/02 |
| | | | | 60/274 |
| 2015/0167596 | A1* | 6/2015 | Tiru | F02M 26/73 |
| | | | | 123/568.12 |
| 2015/0308754 | A1* | 10/2015 | Gautier | F16L 23/032 |
| | | | | 165/177 |
| 2015/0345434 | A1* | 12/2015 | Gautier | F01N 13/00 |
| | | | | 123/568.11 |
| 2016/0010598 | A1* | 1/2016 | Simons | F16K 27/02 |
| | | | | 137/340 |
| 2016/0160812 | A1* | 6/2016 | Yang | F02M 26/73 |
| | | | | 123/568.12 |
| 2016/0252190 | A1* | 9/2016 | Baasch | F01P 1/00 |
| | | | | 137/340 |
| 2016/0339764 | A1* | 11/2016 | Pursifull | F01N 11/002 |
| 2017/0074216 | A1* | 3/2017 | Miki | F02M 26/72 |
| 2017/0227130 | A1* | 8/2017 | Kohlen | F16K 1/2266 |
| 2018/0202396 | A1* | 7/2018 | Zhang | F02M 26/47 |
| 2019/0107034 | A1* | 4/2019 | Hatsuzawa | F02D 9/1035 |
| 2019/0113010 | A1* | 4/2019 | Haigh | F02M 26/66 |

* cited by examiner

EXHAUST GAS RECIRCULATION VALVE WARMING DEVICE

BACKGROUND

1. Field

The present disclosure relates to an exhaust gas recirculation valve warming device.

2. Description of Related Art

An internal combustion engine described in Japanese Laid-Open Patent Publication No. 2013-53558 includes an exhaust gas recirculation passage that extends from an exhaust passage. The downstream end of the exhaust gas recirculation passage is connected to an intake passage. The exhaust gas recirculation passage includes an exhaust gas recirculation valve that adjusts the flow rate of exhaust gas, which flows in the exhaust gas recirculation passage. A housing of the exhaust gas recirculation valve defines a warm water passage through which warm water flows. The warm water passage is supplied with coolant that is warmed by the cylinder block of the internal combustion engine.

When the internal combustion engine starts and exhaust gas flows in the exhaust gas recirculation valve while the temperature of the exhaust gas recirculation valve is low, water contained in the exhaust gas condenses. This may lead to corrosion of parts such as a valve body of the exhaust gas recirculation valve. Accordingly, the exhaust gas recirculation valve is desired to be warmed promptly after the internal combustion engine starts. In the internal combustion engine described in Japanese Laid-Open Patent Publication No. 2013-53558, the cylinder block needs some time to warm coolant after the internal combustion engine starts. Supply of warmed coolant to the warm water passage of the exhaust gas recirculation valve also needs some time. As a result, it takes much time to warm the exhaust gas recirculation valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exhaust gas recirculation valve warming device includes a valve member arranged in an exhaust passage of an internal combustion engine, in which the valve member is configured to adjust a flow rate of exhaust gas flowing in the exhaust passage, an exhaust gas recirculation passage that extends from a portion of the exhaust passage that is upstream of the valve member and is connected to an intake passage of the internal combustion engine, in which the exhaust gas recirculation passage is configured to recirculate exhaust gas to the intake passage, an exhaust gas recirculation valve arranged in the exhaust gas recirculation passage, in which the exhaust gas recirculation valve is configured to adjust a flow rate of exhaust gas flowing in the exhaust gas recirculation passage, and a branch passage that extends from a portion of the exhaust passage that is upstream of the valve member or a portion of the exhaust gas recirculation passage that is upstream of the exhaust gas recirculation valve in a direction in which exhaust gas flows, in which the branch passage is connected to a portion of the exhaust passage that is downstream of the valve member. The exhaust gas recirculation valve includes a valve passage that forms part of the exhaust gas recirculation passage and a warming passage that forms part of the branch passage.

With the above structure, part of exhaust gas flowing in the exhaust passage enters the branch passage. The exhaust gas recirculation valve is warmed when the exhaust gas passes through the warming passage. Warming of the exhaust gas recirculation valve is started immediately after the internal combustion engine is started by such a flow of exhaust gas in the branch passage. This promptly completes the warming of the exhaust gas recirculation valve.

The exhaust gas recirculation valve warming device may include a valve controller configured to selectively control opening and closing of the exhaust gas recirculation valve. The valve controller may control the exhaust gas recirculation valve to a fully closed state after the internal combustion engine is started until a temperature of the exhaust gas recirculation valve reaches a preset temperature.

With the above structure, exhaust gas does not enter the valve passage when the temperature of the exhaust gas recirculation valve is less than or equal to the preset temperature, that is, during warming of the exhaust gas recirculation valve. This prevents condensation in the valve passage. Further, with the above structure, exhaust gas is likely to enter the branch passage as exhaust gas does not enter the valve passage. Thus, much exhaust gas flows in the warming passage that forms part of the branch passage so that warming of the exhaust gas recirculation valve is prompted.

In the exhaust gas recirculation valve warming device, the valve controller may be configured to selectively control opening and closing of the valve member. The valve controller may control the valve member at an opening degree that is less than an opening degree in a fully open state after the internal combustion engine is started until the temperature of the exhaust gas recirculation valve reaches the preset temperature.

The above structure increases the gas pressure of a portion of the exhaust passage that is upstream of the valve member than a case in which the valve member is in the fully open state. As a result, exhaust gas is prompted to enter the branch passage. Further, with the above structure, the gas pressure of a portion of the exhaust passage that is upstream of the valve member is greater than the gas pressure of a portion of the exhaust passage that is downstream of the valve member. Such a difference in gas pressure prompts exhaust gas to flow in the branch passage so that exhaust gas will enter the branch passage furthermore.

In the exhaust gas recirculation valve warming device, the valve controller may control the valve member at an opening degree that is greater than an opening degree in a fully closed state after the internal combustion engine is started until the temperature of the exhaust gas recirculation valve reaches the preset temperature.

If the valve member is fully closed, the gas pressure of a portion of the exhaust passage that is upstream of the valve member becomes excessively high. In this case, exhaust gas is less likely to be discharged from the cylinders into the exhaust passage, which may resist piston operation. However, the above structure restricts an excessive increase in the gas pressure of the exhaust passage so that prompt piston operation is not disturbed.

In the exhaust gas recirculation valve warming device, at least part of the warming passage may be equally spaced from the valve passage and extend in the same direction as the valve passage.

With the above structure, the part of the warming passage extending in the same direction as the valve passage can efficiently warm the valve passage. Condensation needs to be avoided in the valve passage of the exhaust gas recirculation valve so that the temperature of the valve passage is desired to be raised in particular. It is advantageous to warm such a portion efficiently when warming the exhaust gas recirculation valve.

In the exhaust gas recirculation valve warming device, a portion of the branch passage that is upstream of the exhaust gas recirculation valve may be connected to a first coolant passage in which coolant flows. A portion of the branch passage that is downstream of the exhaust gas recirculation valve may be connected to a second coolant passage in which coolant flows. A first three-way valve may be arranged at a location where the branch passage and the first coolant passage are connected to each other. A second three-way valve may be arranged at a location where the branch passage and the second coolant passage are connected to each other.

The above structure allows coolant to flow in the branch passage. That is, the branch passage is used as an exhaust gas passage for warming the exhaust gas recirculation valve, and part of the branch passage is used as a coolant passage for cooling the exhaust gas recirculation valve.

The exhaust gas recirculation valve warming device may include a three-way valve controller that controls the first three-way valve and the second three-way valve. The three-way valve controller may be configured to, after the internal combustion engine is started until the temperature of the exhaust gas recirculation valve reaches the preset temperature, control the first three-way valve to block a flow of coolant between the first coolant passage and the branch passage. The three-way valve controller may also be configured to control the second three-way valve to block a flow of coolant between the second coolant passage and the branch passage. The three-way valve controller may also be configured to, when the temperature of the exhaust gas recirculation valve exceeds the preset temperature, control the first three-way valve to allow a flow of coolant between the first coolant passage and a portion of the branch passage that extends to the exhaust gas recirculation valve from the first three-way valve, and control the second three-way valve to allow a flow of coolant between the second coolant passage and a portion of the branch passage that extends to the exhaust gas recirculation valve from the second three-way valve.

With the above structure, only exhaust gas flows in the branch passage without coolant when the temperature of the exhaust gas recirculation valve is less than or equal to the preset temperature, that is, during warming of the exhaust gas recirculation valve. In contrast, only coolant flows between the first three-way valve and the second three-way valve of the branch passage without exhaust gas when the temperature of the exhaust gas recirculation valve exceeds the preset temperature, that is, after the warming of the exhaust gas recirculation valve. This restricts mixing of exhaust gas with coolant in the branch passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An internal combustion engine 10 including an exhaust gas recirculation valve warming device according to one embodiment will now be described with reference to the drawings.

Figure 1:
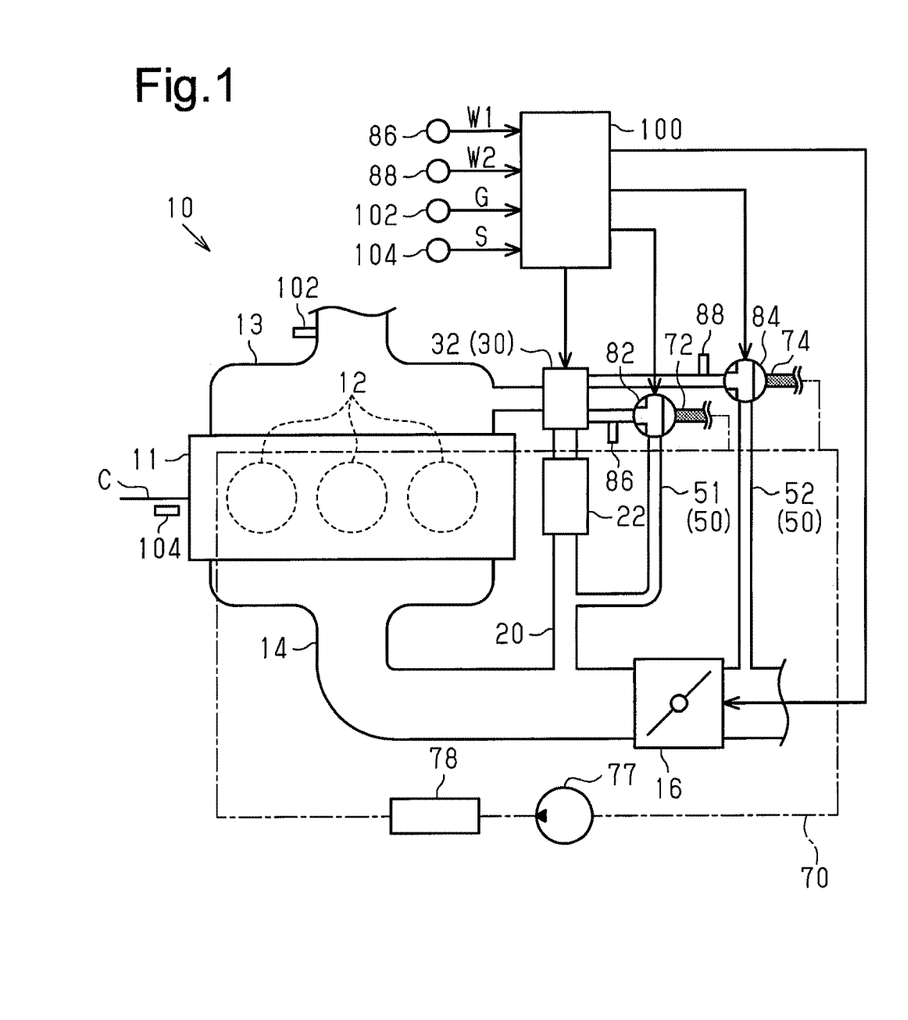
FIG. 1 is a schematic view showing an internal combustion engine that includes an exhaust gas recirculation valve warming device according to one embodiment.

A schematic description of the internal combustion engine 10 will focus on the passage structures of an intake system and a discharge system. As shown in FIG. 1, the internal combustion engine 10 includes an engine body 11 in which three cylinders 12 are defined. The cylinders 12 each accommodate a piston (not shown). The piston is connected to crankshaft C via a connecting rod. A crank angle sensor 104 that detects crank position S as the rotational position of crankshaft C is arranged in proximity to crankshaft C.

The engine body 11 is connected to an intake passage 13 that introduces intake air from outside to the cylinders 12. The intake passage 13 includes an air flowmeter 102 that detects intake air amount G of intake air flowing in the intake passage 13. The engine body 11 is also connected to an exhaust passage 14 that discharges exhaust gas from the cylinders 12. The exhaust passage 14 includes an exhaust throttle 16 that serves as a valve member configured to change the opening degree so as to adjust the flow rate of exhaust gas flowing in the exhaust passage 14. The exhaust throttle 16 is a butterfly valve.

An exhaust gas recirculation passage 20 that recirculates exhaust gas into the intake passage 13 extends from a portion of the exhaust passage 14 that is upstream of the exhaust throttle 16. The downstream end for the exhaust gas recirculation passage 20 is connected to the intake passage 13. The exhaust gas recirculation passage 20 includes an exhaust gas recirculation cooler 22 that cools exhaust gas flowing in the exhaust gas recirculation passage 20. The exhaust gas recirculation passage 20 includes an exhaust gas recirculation valve 30 at a portion that is downstream of the exhaust gas recirculation cooler 22 in the direction in which exhaust gas flows. The exhaust gas recirculation valve 30 changes the opening degree so as to adjust the flow rate of exhaust gas flowing in the exhaust gas recirculation passage 20. The structure of the exhaust gas recirculation valve 30 will be described in detail later.

A branch passage 50 extends from the exhaust gas recirculation passage 20 to a portion of the exhaust passage 14 that is downstream of the exhaust throttle 16. Specifically, an upstream branch passage 51, which is part of the branch passage 50, extends from a portion of the exhaust gas recirculation passage 20 that is upstream of the exhaust gas recirculation cooler 22 in the direction in which exhaust gas flows. The upstream branch passage 51 is connected to a housing 32 of the exhaust gas recirculation valve 30. A downstream branch passage 52, which is part of the branch passage 50, extends from the housing 32 of the exhaust gas recirculation valve 30. The upstream branch passage 51 and the downstream branch passage 52 are connected to each other inside the housing 32 of the exhaust gas recirculation valve 30. The downstream branch passage 52 is connected to a portion of the exhaust passage 14 that is downstream of the exhaust throttle 16. The materials of the upstream branch passage 51 and the downstream branch passage 52 are stainless steel.

Figure 2:
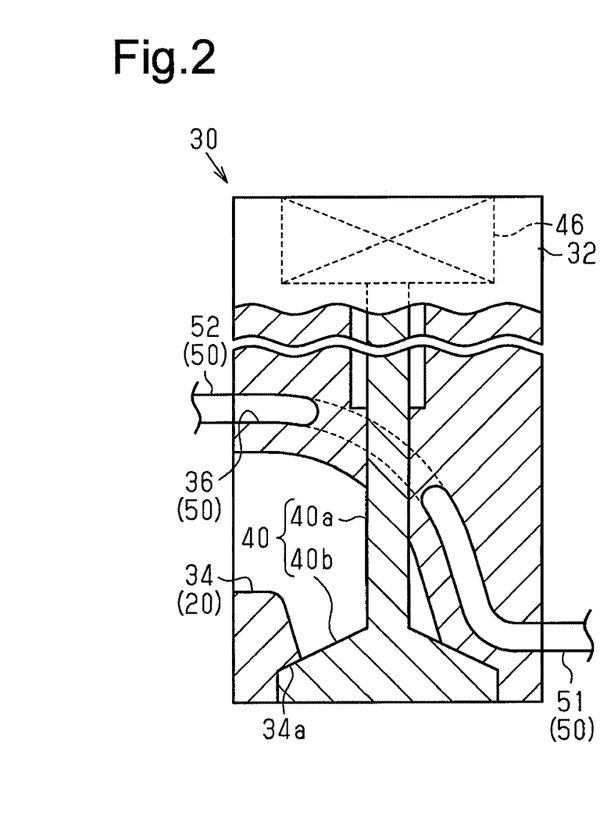
FIG. 2 is a cross-sectional view of the exhaust gas recirculation valve in FIG. 1.

The structure of the exhaust gas recirculation valve 30 will now be described. As shown in FIG. 2, the housing 32 of the exhaust gas recirculation valve 30 is substantially columnar. The housing 32 includes a through-hole (not shown). A wall surface of the through-hole defines a valve passage 34. The valve passage 34 forms part of the exhaust gas recirculation passage 20. Specifically, the opening at one side of the valve passage 34 is connected to the exhaust gas recirculation passage 20 that is upstream of the exhaust gas recirculation valve 30, and the opening at the other side of the valve passage 34 is connected to the exhaust gas recirculation passage 20 that is downstream of the exhaust gas recirculation valve 30.

The inlet end of the valve passage 34 is open on the end surface at one side in the axial direction of the housing 32. The valve passage 34 is bent relative to the direction in which the valve passage 34 is extended. The outlet end of the valve passage 34 is open on the outer surface of the housing 32. The openings of the inlet and the outlet of the valve passage 34 are orientated in directions that are different from each other. An end of the inlet of the valve passage 34 has a cross-sectional passage area that is greater than other portions of the valve passage 34. As a result, the valve passage 34 has a step surface as a valve seat 34a. A valve body 40 that opens and closes the valve passage 34 abuts the step surface.

The valve body 40 is accommodated in the housing 32. The valve body 40 includes a stem 40a that extends in the axial direction of the housing 32. The distal end of the stem 40a includes a wide portion 40b that abuts the valve seat 34a. The end of the stem 40a, which is opposite to the wide portion 40b, extends through the inner wall of the valve passage 34. The end of the stem 40a that is opposite to the wide portion 40b is connected to a drive mechanism 46 that is accommodated in the housing 32. The drive mechanism 46 is configured to include an electric motor. The drive mechanism 46 reciprocates the stem 40a in the axial direction. The wide portion 40b abuts and moves away from the valve seat 34a accordingly so as to change the opening degree of the exhaust gas recirculation valve 30.

The housing 32 includes another through-hole (not shown) that is different from the valve passage 34. A wall surface of the through-hole defines a warming passage 36. The warming passage 36 forms part of the branch passage 50. Specifically, the opening at one side of the warming passage 36 is connected to the upstream branch passage 51 and the opening at the other side of the warming passage 36 is connected to the downstream branch passage 52.

The warming passage 36 is located between the valve passage 34 and the drive mechanism 46. Part of an upstream portion of the warming passage 36 is equally spaced from the valve passage 34 and extends in the same direction as the valve passage 34. A middle portion of the warming passage 36 extends and bypasses the stem 40a of the valve body 40. Part of a downstream portion of the warming passage 36 is equally spaced from the valve passage 34 and extends in the same direction as the valve passage 34. There are no other members, recesses, or spaces between the warming passage 36 and the valve passage 34. The material of the housing 32 is stainless steel in the same manner as the materials of the upstream branch passage 51 and the downstream branch passage 52.

A coolant channel system in the internal combustion engine 10 will now be described.

As shown in FIG. 1, the internal combustion engine 10 includes a coolant circuit 70 through which coolant flows. The coolant circuit 70 includes a coolant pump 77 that feeds coolant inside the coolant circuit 70. The coolant circuit 70 includes a radiator 78 that cools coolant at a portion that is downstream of the coolant pump 77. A portion of the coolant circuit 70 that is downstream of the radiator 78 is connected to the inside of the engine body 11. A portion of the coolant circuit 70 that is downstream of the engine body 11 is connected to the coolant pump 77. Thus, coolant fed by the coolant pump 77 flows through the radiator 78 and the engine body 11 and then returns to the coolant pump 77.

A first coolant passage 72 branches from the portion of the coolant circuit 70 that is downstream of the engine body 11. As shown by dots in FIG. 1, coolant flows in the first coolant passage 72. The first coolant passage 72 is connected to the upstream branch passage 51, which is a portion of the branch passage 50 that is upstream of the exhaust gas recirculation valve 30. A second coolant passage 74 branches from a portion of the coolant circuit 70 that is downstream of the portion where the first coolant passage 72 is branched. As shown by the dots in FIG. 1, coolant flows in the second coolant passage 74. The second coolant passage 74 is connected to the downstream branch passage 52, which is a portion of the branch passage 50 that is downstream of the exhaust gas recirculation valve 30.

Figure 3:
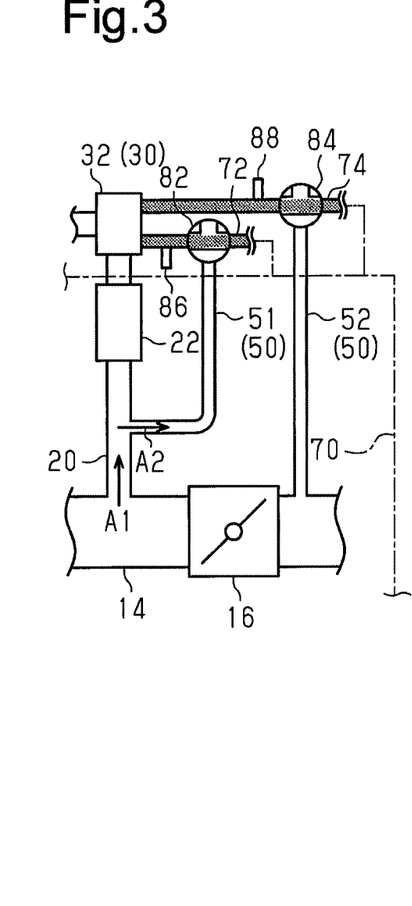
FIG. 3 is a diagram illustrating a state in which a first three-way valve and a second three-way valve are both in a coolant connection mode.

A first three-way valve 82 that connects and disconnects passages is arranged at a location where first coolant passage 72 and the upstream branch passage 51 are connected to each other. The first three-way valve 82 connects two passages of three passages to each other and disconnects the remaining one passage. Specifically, the first three-way valve 82 is capable of operating in a coolant disconnection mode and a coolant connection mode. When in the coolant disconnection mode, the first three-way valve 82 disconnects the first coolant passage 72 and the upstream branch passage 51 from each other and connects portions of the upstream branch passage 51 that are upstream and downstream of the first three-way valve 82. When in the coolant connection mode as shown in FIG. 3, the first three-way valve 82 connects the first coolant passage 72 and a portion of the upstream branch passage 51 that is closer to the exhaust gas recirculation valve 30 than the first three-way valve 82 and disconnects the portions of the upstream branch passage 51 that are upstream and downstream of the first three-way valve 82.

As shown in FIG. 1, a second three-way valve 84 that connects and disconnects passages is arranged at a location where the second coolant passage 74 and the downstream branch passage 52 are connected to each other. The second three-way valve 84 connects two passages of three passages to each other and disconnects the remaining one passage. Specifically, the second three-way valve 84 is capable of operating in a coolant disconnection mode and a coolant connection mode. When in the coolant disconnection mode, the second three-way valve 84 disconnects the second coolant passage 74 and the downstream branch passage 52 from each other and connects portions of the downstream branch passage 52 that are upstream and downstream of the second three-way valve 84. When in the coolant connection mode as shown in FIG. 3, the second three-way valve 84 connects the second coolant passage 74 and a portion of the downstream branch passage 52 that is closer to the exhaust gas recirculation valve 30 than the second three-way valve 84 and disconnects the portions of the downstream branch passage 52 that are upstream and downstream of the second three-way valve 84.

As shown in FIG. 1, a first condensation sensor 86 that determines presence or absence W1 of water droplets is arranged near the first three-way valve 82 in the upstream branch passage 51. The first condensation sensor 86 is located closer to the exhaust gas recirculation valve 30 than the first three-way valve 82 in the upstream branch passage 51. The first condensation sensor 86 detects presence or absence W1 of water droplets when a current value changes in accordance with the presence of the water droplets.

A second condensation sensor 88 that detects presence or absence W2 of water droplets is arranged near the second three-way valve 84 in the downstream branch passage 52. The second condensation sensor 88 is located closer to the exhaust gas recirculation valve 30 than the second three-way valve 84 in the downstream branch passage 52. The second condensation sensor 88 detects presence or absence W2 of water droplets when a current value changes in accordance with the presence of the water droplets in the same manner as the first condensation sensor 86.

Control of the internal combustion engine 10 will now be described. An electronic control unit 100 included in the internal combustion engine 10 controls opening and closing of the exhaust throttle 16, opening and closing of the exhaust gas recirculation valve 30, and connection and disconnection of the passages at the first three-way valve 82 and the second three-way valve 84. The electronic control unit 100 of the present embodiment corresponds to a valve controller. The electronic control unit 100 is a computer including a nonvolatile storage unit that stores various types of programs, a CPU that executes the various types of programs, and a volatile RAM that temporarily stores data when the programs are executed, and the like.

The electronic control unit 100 receives detection signals from various types of sensors that are attached to the internal combustion engine 10. Specifically, the electronic control unit 100 receives information about presence or absence W1 of water droplets determined by the first condensation sensor 86 and information about presence or absence W2 of water droplets determined by the second condensation sensor 88. The electronic control unit 100 also receives intake air amount G detected by the air flowmeter 102 and crank position S detected by the crank angle sensor 104.

The electronic control unit 100 calculates engine rotation speed NE, which is the number of revolutions of crankshaft C per unit time, based on crank position S. The electronic control unit 100 also calculates engine load factor KL based on engine rotation speed NE and intake air amount G. The electronic control unit 100 calculates the temperature of the exhaust gas recirculation valve 30 based on engine rotation speed NE and engine load factor KL.

The electronic control unit 100 changes the opening degrees of the exhaust throttle 16 and the exhaust gas recirculation valve 30 and the modes of the first three-way valve 82 and the second three-way valve 84 in accordance with the relationship between the temperature of the exhaust gas recirculation valve 30 and preset temperature M determined in advance. Preset temperature M is a value that indicates the dew-point temperature of the exhaust gas recirculation valve 30 and is also a value that indicates completion of warming of the exhaust gas recirculation valve 30. Water generated when fuel is burned is determined depending on the components of fuel. Preset temperature M is determined in advance by experiments or the like based on the relationship between the components of fuel and water generated when fuel is burned.

The electronic control unit 100 controls the exhaust gas recirculation valve 30 to the fully closed state and the exhaust throttle 16 at preset opening degree P after the internal combustion engine 10 is started until the temperature of the exhaust gas recirculation valve 30 reaches preset temperature M. Preset opening degree P is an opening degree that is less than the fully open state and greater than the fully closed state. If the gas pressure of a portion of the exhaust passage 14 that is upstream of the exhaust throttle 16 is excessively high, exhaust gas is less likely to be discharged from the cylinders 12 into the exhaust passage 14, which may resist piston operation. Preset opening degree P is determined in advance by experiments or the like as a minimum opening degree at which resistance to piston operation is within a permissible range.

The electronic control unit 100 shifts the first three-way valve 82 and the second three-way valve 84 to a coolant disconnection mode after the internal combustion engine 10 is started until the temperature of the exhaust gas recirculation valve 30 reaches preset temperature M. The electronic control unit 100 shifts first three-way valve 82 and the second three-way valve 84 to a coolant connection mode when the temperature of the exhaust gas recirculation valve 30 exceeds preset temperature M.

Valve control processing performed by the electronic control unit 100 will now be described.

When the internal combustion engine 10 is started, the electronic control unit 100 performs a valve control process that controls the exhaust throttle 16, the exhaust gas recirculation valve 30, the first three-way valve 82, and the second three-way valve 84. The following valve control process is forcibly ended during the process if the internal combustion engine 10 is stopped.

Figure 4:
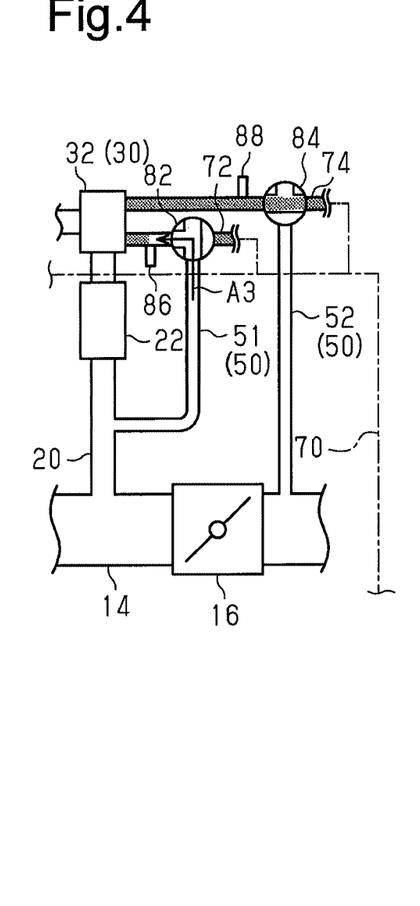
FIG. 4 is a diagram illustrating a state in which the first three-way valve is in a coolant disconnection mode and the second three-way valve is in a coolant connection mode.
Figure 6:
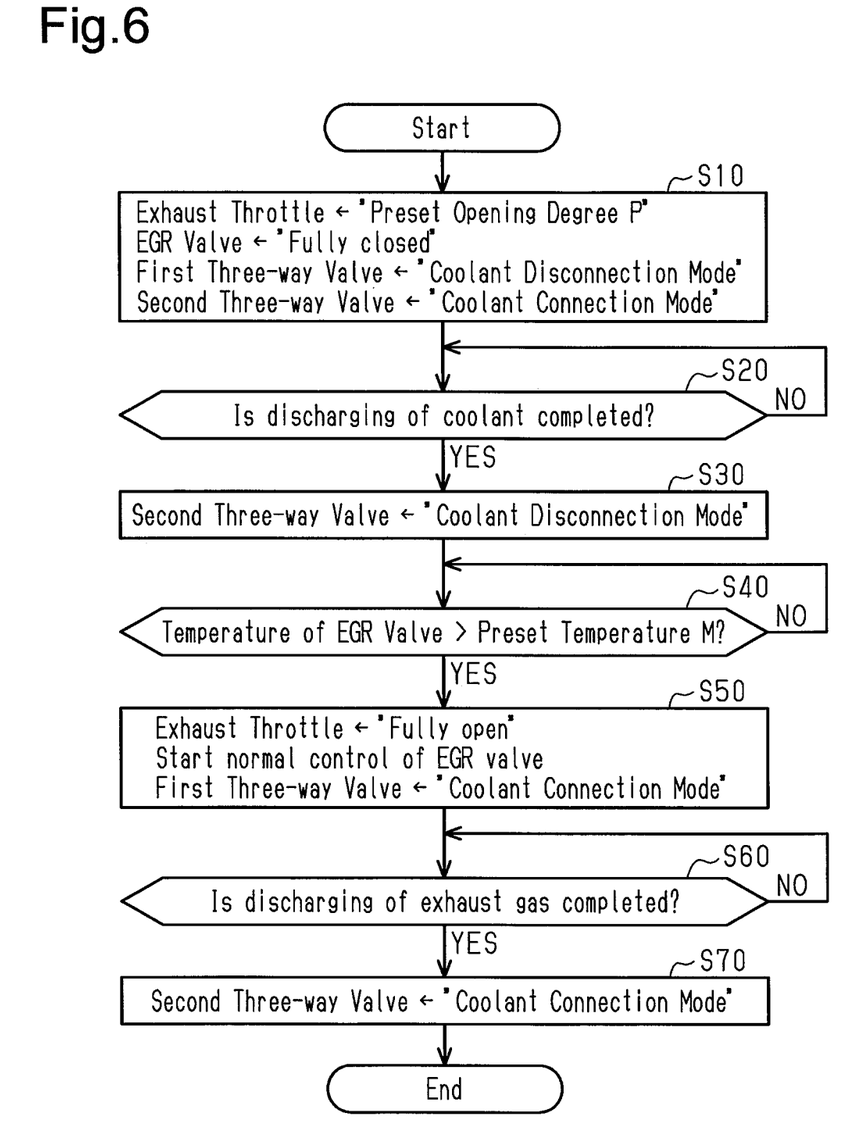
FIG. 6 is a flowchart showing a procedure for valve control processes.

As shown in FIG. 6, the electronic control unit 100 performs a process in step S10 upon starting the valve control process. In step S10, the electronic control unit 100 controls the exhaust throttle 16 at preset opening degree P. The electronic control unit 100 controls the exhaust gas recirculation valve 30 to the fully closed state. The electronic control unit 100 shifts the first three-way valve 82 to a coolant disconnection mode. The electronic control unit 100 shifts the second three-way valve 84 to a coolant connection mode. Specifically, as shown in FIG. 4, the first coolant passage 72 and the upstream branch passage 51 are disconnected from each other, and the second coolant passage 74 and the downstream branch passage 52 are connected to each other. If the first three-way valve 82 is in the coolant disconnection mode at the time of performing the process in step S10, the electronic control unit 100 maintains the first three-way valve 82 in the coolant disconnection mode. If the second three-way valve 84 is in the coolant connection mode at the time of performing the process in step S10, the electronic control unit 100 maintains the second three-way valve 84 in the coolant connection mode. As shown in FIG. 6, after performing the process in step S10, the electronic control unit 100 advances the process to step S20.

In step S20, the electronic control unit 100 determines whether discharging of coolant from the branch passage 50 is completed. The electronic control unit 100 performs the determination in step S20 based on detection results of the first condensation sensor 86 and the second condensation sensor 88. If neither the first condensation sensor 86 nor the second condensation sensor 88 detects water droplets, the electronic control unit 100 determines that discharging of coolant from the branch passage 50 is completed. Otherwise, the electronic control unit 100 determines that coolant still remains in the branch passage 50. If the determination in step S20 indicates NO, the electronic control unit 100 performs the determination in step S20 again. The electronic control unit 100 repeats the determination in step S20 until the determination in step S20 indicates YES, that is, until discharging of coolant is completed. When the determination in step S20 indicates YES, the electronic control unit 100 advances the process to step S30.

In step S30, the electronic control unit 100 shifts the second three-way valve 84 to the coolant disconnection mode. Specifically, as shown in FIG. 1, the first coolant passage 72 and the upstream branch passage 51 are disconnected from each other, and the second coolant passage 74 and the downstream branch passage 52 are disconnected from each other. As shown in FIG. 6, after performing the process in step S30, the electronic control unit 100 advances the process to step S40.

In step S40, the electronic control unit 100 determines whether the temperature of the exhaust gas recirculation valve 30 is greater than preset temperature M. If the temperature of the exhaust gas recirculation valve 30 is less than or equal to preset temperature M (step S40: NO), the electronic control unit 100 performs the process in step S40 again. The electronic control unit 100 repeats the process in step S40 until the temperature of the exhaust gas recirculation valve 30 becomes greater than preset temperature M, that is, until warming of the exhaust gas recirculation valve 30 is completed. When the temperature of the exhaust gas recirculation valve 30 is greater than preset temperature M (step S40: YES), the electronic control unit 100 advances the process to step S50.

Figure 5:
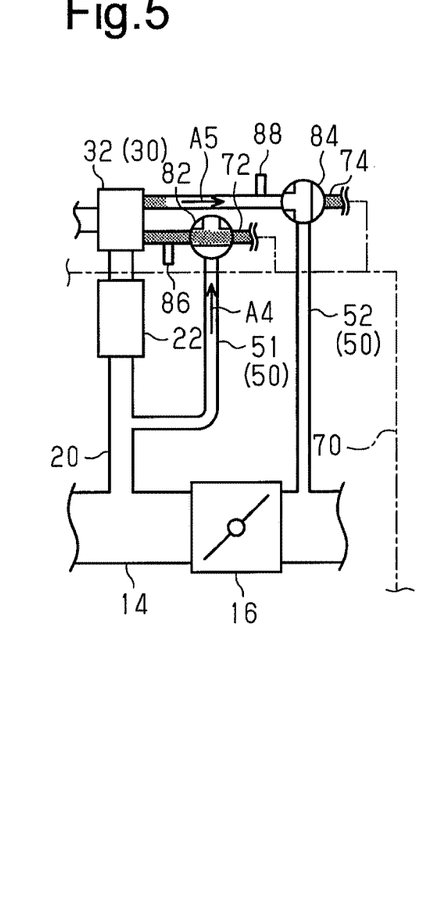
FIG. 5 is a diagram illustrating a state in which the first three-way valve is in a coolant connection mode and the second three-way valve is in a coolant disconnection mode.

In step S50, the electronic control unit 100 controls the exhaust throttle 16 to the fully open state. The electronic control unit 100 also starts normal control of the exhaust gas recirculation valve 30. In this normal control, the electronic control unit 100 controls the opening degree of the exhaust gas recirculation valve 30 based on engine rotation speed NE and engine load factor KL. When the electronic control unit 100 starts normal control, the electronic control unit 100 repeats normal control in predetermined control cycles until the internal combustion engine 10 is stopped. In step S50, the electronic control unit 100 shifts the first three-way valve 82 to the coolant connection mode. That is, as shown in FIG. 5, the first coolant passage 72 and the upstream branch passage 51 are connected to each other. As shown in FIG. 6, after performing the process in step S50, the electronic control unit 100 advances the process to step S60.

In step S60, the electronic control unit 100 determines whether discharging of exhaust gas from the portion of the branch passage 50 between the first three-way valve 82 and the second three-way valve 84 is completed. The electronic control unit 100 performs the determination in step S60 based on detection results of the first condensation sensor 86 and the second condensation sensor 88. If both of the first condensation sensor 86 and the second condensation sensor 88 detect water droplets, the electronic control unit 100 determines that discharging of exhaust gas is completed. Otherwise, the electronic control unit 100 determines that exhaust gas remains. If the determination in step S60 indicates NO, the electronic control unit 100 performs the determination in step S60 again. The electronic control unit 100 repeats the determination in step S60 until the determination in step S60 indicates YES. When the determination in step S60 indicates YES, the electronic control unit 100 advances the process to step S70.

In step S70, the electronic control unit 100 shifts the second three-way valve 84 to the coolant connection mode. That is, as shown in FIG. 3, the second coolant passage 74 and the downstream branch passage 52 are connected to each other. As shown in FIG. 6, after performing the process in step S70, the electronic control unit 100 ends the series of processes.

An operation of the valve control process will now be described.

As shown in FIG. 3, before the internal combustion engine 10 is started, the first three-way valve 82 and the second three-way valve 84 are both in the coolant connection mode. In this case, as shown by dots in FIG. 3, coolant fills the portion of the branch passage 50 between the first three-way valve 82 and the second three-way valve 84.

When the internal combustion engine 10 is started, the exhaust throttle 16 is controlled at preset opening degree P (step S10). This increases the gas pressure of a portion of the exhaust passage 14 that is upstream of the exhaust throttle 16 than a case in which the exhaust throttle 16 is in the fully open state. As a result, exhaust gas is prompted to enter the exhaust gas recirculation passage 20. As shown by Arrow A1 in FIG. 3, exhaust gas enters the exhaust gas recirculation passage 20. When the internal combustion engine 10 is started, the exhaust gas recirculation valve 30 is controlled to the fully closed state (step S10). Accordingly, exhaust gas that has flowed from the exhaust passage 14 into the exhaust gas recirculation passage 20 does not flow toward a portion of the exhaust gas recirculation passage 20 that is downstream of the exhaust gas recirculation valve 30. Exhaust gas that has flowed from the exhaust passage 14 into the exhaust gas recirculation passage 20 enters the upstream branch passage 51 as shown by Arrow A2 in FIG. 3.

When the internal combustion engine 10 is started, the first three-way valve 82 is shifted to the coolant disconnection mode as shown in FIG. 4 (step S10). This blocks entering of coolant from the first coolant passage 72 to the upstream branch passage 51. As shown by Arrow A3 in FIG. 4, exhaust gas flows through portions of the upstream branch passage 51 that are upstream and downstream of the first three-way valve 82. The gas pressure of this exhaust gas feeds coolant to a downstream portion of the branch passage 50 between the first three-way valve 82 and the second three-way valve 84 in the branch passage 50 as shown by dots in FIG. 4. The coolant fed to the downstream is discharged out of the branch passage 50 via the second coolant passage 74. Exhaust gas eventually fills the portion of the branch passage 50 between the first three-way valve 82 and the second three-way valve 84, thereby completing discharging of coolant (step S20: YES). In this case, the second three-way valve 84 is shifted to the coolant disconnection mode as shown in FIG. 1 (step S30). Accordingly, exhaust gas flows through the entire branch passage 50. That is, exhaust gas that has entered the branch passage 50 from the exhaust gas recirculation passage 20 reaches a portion of the exhaust passage 14 that is downstream of the exhaust throttle 16. Since the exhaust throttle 16 is controlled at preset opening degree P, the gas pressure of a portion of the exhaust passage 14 that is upstream of the exhaust throttle 16 is greater than the gas pressure of the portion of the exhaust passage 14 that is downstream of the exhaust throttle 16. Such a difference in gas pressure prompts exhaust gas to flow in the branch passage 50 so that exhaust gas will enter the branch passage 50 furthermore.

Exhaust gas flowing in the branch passage 50 warms the housing 32 of the exhaust gas recirculation valve 30 when the exhaust gas passes through the warming passage 36 inside the housing 32 of the exhaust gas recirculation valve 30. This gradually warms the exhaust gas recirculation valve 30.

When the temperature of the exhaust gas recirculation valve 30 exceeds preset temperature M (step S40: YES), that is, when warming of the exhaust gas recirculation valve 30 is completed, the exhaust throttle 16 is fully open (step S50). The exhaust gas recirculation valve 30 changes an opening degree by normal control (step S50). The internal combustion engine 10 is in normal operation accordingly.

Further, when the warming of the exhaust gas recirculation valve 30 is completed, as shown in FIG. 5, the first three-way valve 82 is shifted to the coolant connection mode (step S50). Thus, as shown by Arrow A4 in FIG. 5, the first three-way valve 82 blocks the flow of exhaust gas from a portion of the upstream branch passage 51 that is upstream of the first three-way valve 82. As shown by dots in FIG. 5, coolant enters the upstream branch passage 51 from the first coolant passage 72. As shown by Arrow A5 in FIG. 5, the coolant feeds exhaust gas to a downstream portion of the branch passage 50 between the first three-way valve 82 and the second three-way valve 84. When coolant reaches the second three-way valve 84, exhaust gas is discharged from the portion of the branch passage 50 between the first three-way valve 82 and the second three-way valve 84, and coolant fills the portion of the branch passage 50 between the first three-way valve 82 and the second three-way valve 84 (step S60: YES). In this case, the second three-way valve 84 is shifted to the coolant connection mode as shown in FIG. 3 (step S70). Coolant flows in the portion of the branch passage 50 between the first three-way valve 82 and the second three-way valve 84. This cools the exhaust gas recirculation valve 30.

The present embodiment has the following advantages.

(1) When the internal combustion engine 10 starts and exhaust gas flows in the exhaust gas recirculation valve 30 while the temperature of the exhaust gas recirculation valve 30 is low, water contained in the exhaust gas condenses. This may lead to corrosion of parts such as the valve body 40 of the exhaust gas recirculation valve 30. Accordingly, the exhaust gas recirculation valve 30 is desired to be warmed promptly. With the above structure, the housing 32 of the exhaust gas recirculation valve 30 includes the warming passage 36 that is separate from the valve passage 34 of the exhaust gas recirculation passage 20. The exhaust gas recirculation valve 30 is warmed when exhaust gas flows in the warming passage 36. Warming of the exhaust gas recirculation valve 30 is started immediately after the internal combustion engine 10 is started by using exhaust gas in this manner. This promptly completes the warming of the exhaust gas recirculation valve 30.

(2) When the exhaust gas recirculation valve 30 is warmed, the exhaust gas recirculation valve 30 is set to the fully closed state. Thus, when the exhaust gas recirculation valve 30 is warmed, exhaust gas does not enter the valve passage 34. This prevents condensation in the valve passage 34. When the exhaust gas recirculation valve 30 is in the fully closed state, exhaust gas is prompted to enter the branch passage 50 as described above with respect to a flow of exhaust gas. This prompts warming of the exhaust gas recirculation valve 30.

(3) When the exhaust gas recirculation valve 30 is warmed, the opening degree of the exhaust throttle 16 is set to preset opening degree P, which is less than the fully open state and greater than the fully closed state. The opening degree of the exhaust gas exhaust throttle 16 is less than the opening degree in the fully open state so that exhaust gas is prompted to enter the branch passage 50 as described above with respect to a flow of exhaust gas. This prompts warming of the exhaust gas recirculation valve 30. The opening degree of the exhaust throttle 16 is greater than the opening degree in the fully closed state so that the gas pressure of a portion of the exhaust passage 14 that is upstream of the exhaust throttle 16 does not become excessively high. Thus, exhaust gas is easily discharged from the cylinders 12 into the exhaust passage 14 without disturbing piston operation.

(4) Part of the upstream portion and part of the downstream portion of the warming passage 36, which is included in the housing 32 of the exhaust gas recirculation valve 30, are equally spaced from the valve passage 34 and extend in the same direction as the valve passage 34. There are no other members, recesses, or spaces between the warming passage 36 and the valve passage 34. With this structure, when exhaust gas is allowed to flow in the warming passage 36, part of the upstream portion and part of the downstream portion of the warming passage 36 can efficiently warm the valve passage 34. Condensation needs to be avoided in the valve passage 34 of the exhaust gas recirculation valve 30 so that the temperature of the valve passage 34 is desired to be raised in particular. It is advantageous to warm such a portion efficiently when warming the exhaust gas recirculation valve 30.

(5) Immediately after the internal combustion engine 10 is started, the temperature of the branch passage 50 may be low. If exhaust gas flows in the branch passage 50 in this state, water contained in the exhaust gas condenses. In the above structure, the material of the branch passage 50 is stainless steel and is less likely to experience corrosion. Thus, even if condensation occurs in the branch passage 50, corrosion of the branch passage 50 is restricted.

(6) With the above embodiment, the branch passage 50 is used as an exhaust gas passage for warming the exhaust gas recirculation valve 30, and part of the branch passage 50 is used as a coolant passage for cooling the exhaust gas recirculation valve 30. Such a single member having two functions simplifies the structure of the internal combustion engine 10 and reduces the number of parts.

(7) In the above embodiment, coolant is discharged from the branch passage 50 in response to the start of the internal combustion engine 10. If the first three-way valve 82 and the second three-way valve 84 are shifted to the coolant disconnection mode at the same time, coolant will remain in a portion of the branch passage 50 between the first three-way valve 82 and the second three-way valve 84, while the upstream branch passage 51 and the first coolant passage 72 are disconnected from each other, and the downstream branch passage 52 and the second coolant passage 74 are disconnected from each other. In this case, the remaining coolant will flow from the branch passage 50 into the exhaust passage 14.

In this respect, in the above embodiment, the first three-way valve 82 and the second three-way valve 84 connect and disconnect passages at different times based on detection results of the first condensation sensor 86 and the second condensation sensor 88. Specifically, the first three-way valve 82 is first shifted to the coolant disconnection mode, discharging of coolant from the portion of the branch passage 50 between the first three-way valve 82 and the second three-way valve 84 is detected, and then the second three-way valve 84 is shifted to the coolant disconnection mode. This restricts discharging of coolant into the exhaust passage 14.

(8) The same advantages as in (7) above are also provided when the first three-way valve 82 and the second three-way valve 84 are shifted to the coolant connection mode. Specifically, if the first three-way valve 82 and the second three-way valve 84 are shifted to the coolant connection mode at the same time when exhaust gas is discharged from the portion of the branch passage 50 between the first three-way valve 82 and the second three-way valve 84 in response to completion of warming of the exhaust gas recirculation valve 30, exhaust gas will remain in the portion of the branch passage 50 between the first three-way valve 82 and the second three-way valve 84, while the upstream branch passage 51 and the first coolant passage 72 are connected to each other, and the downstream branch passage 52 and the second coolant passage 74 are connected to each other. In this case, the remaining exhaust gas will be mixed with coolant flowing into the branch passage 50.

In this respect, in the above structure, the first three-way valve 82 and the second three-way valve 84 connect and disconnect passages at different times based on detection results of the first condensation sensor 86 and the second condensation sensor 88. Specifically, the first three-way valve 82 is first shifted to the coolant connection mode, discharging of exhaust gas from the portion of the branch passage 50 between the first three-way valve 82 and the second three-way valve 84 is detected, and then the second three-way valve 84 is shifted to the coolant connection mode. This restricts mixing of exhaust gas with coolant.

(9) The warming passage 36 included in the housing 32 of the exhaust gas recirculation valve 30 is located between the valve passage 34 and the drive mechanism 46. Thus, coolant flowing in the warming passage 36 effectively restricts a thermal effect of exhaust gas that flows in the valve passage 34 on the drive mechanism 46.

The present embodiment may be modified as follows. The present embodiment and the following modification can be combined as long as the combined modifications are not in contradiction.

In step S20 of the valve control process, the method of determining completion of discharging of coolant from the portion of the branch passage 50 between the first three-way valve 82 and the second three-way valve 84 is not limited to the embodiment in which the first condensation sensor 86 and the second condensation sensor 88 are used. Completion of discharging of coolant may be determined based on, for example, the amount of time elapsed from when the process in step S10 is completed. Specifically, the time required to complete discharging of coolant after the first three-way valve 82 is shifted to the coolant disconnection mode may be determined in advance so that when the required time has elapsed, the second three-way valve 84 will be shifted to the coolant disconnection mode. The required time may be determined by experiments or the like in accordance with the length of the branch passage 50, a gas pressure, and parameters such as a coolant pressure.

In step S60 of the valve control process, the method of determining completion of discharging of exhaust gas from the portion of the branch passage 50 between the first three-way valve 82 and the second three-way valve 84 is not limited to the embodiment in which the first condensation sensor 86 and the second condensation sensor 88 are used. Completion of discharging of exhaust gas may be determined based on, for example, the amount of time elapsed from when the process in step S50 is completed. Specifically, the time required to complete discharging of exhaust gas after the first three-way valve 82 is shifted to the coolant connection mode may be determined in advance so that when the required time has elapsed, the second three-way valve 84 will be shifted to the coolant connection mode. The required time may be determined by experiments or the like in accordance with the length of the branch passage 50, a gas pressure, and parameters such as a coolant pressure.

If neither the first condensation sensor 86 nor the second condensation sensor 88 is used in step S20 or step S60 of the valve control process as in the two modifications above, the first condensation sensor 86 and the second condensation sensor 88 may be omitted.

The second coolant passage 74 may branch from a portion of the coolant circuit 70 that is upstream of the portion where the first coolant passage 72 is branched. That is, coolant only needs to flow in a portion of the branch passage 50 between the first three-way valve 82 and the second three-way valve 84 and the coolant only needs to be discharged from the portion of the branch passage 50 between the first three-way valve 82 and the second three-way valve 84 through the first coolant passage 72 and the second coolant passage 74.

The structure that connects and disconnects the first coolant passage 72 and the upstream branch passage 51 is not limited to the first three-way valve 82. A valve member that opens and closes the first coolant passage 72 may be arranged in the first coolant passage 72, and a valve member that opens and closes the upstream branch passage 51 may be arranged in a location of the upstream branch passage 51 that is upstream of the location where the upstream branch passage 51 and the first coolant passage 72 are connected to each other. When the first coolant passage 72 and the upstream branch passage 51 are disconnected from each other, the valve member arranged in the first coolant passage 72 is set to the fully closed state and the valve member arranged in the upstream branch passage 51 is set to the fully open state. When the first coolant passage 72 and the upstream branch passage 51 are connected to each other, the valve member arranged in the first coolant passage 72 is set to the fully open state and the valve member arranged in the upstream branch passage 51 is set to the fully closed state. Such a mode also connects and disconnects the passages in the same manner as the first three-way valve 82.

The structure that connects and disconnects the second coolant passage 74 and the downstream branch passage 52 is not limited to the second three-way valve 84 in the same manner as the above modifications.

Use of the branch passage 50 as a passage of coolant may be omitted. That is, connection of the first coolant passage 72 and the second coolant passage 74 to the branch passage 50 may be omitted. In this case, the branch passage 50 serves as a passage dedicated to exhaust gas. When the branch passage 50 is used as the passage dedicated to exhaust gas, coolant will not be discharged into the exhaust passage 14 or mixed with exhaust gas. In addition, when the branch passage 50 serves as the passage dedicated to exhaust gas, a passage dedicated to coolant may be defined in the housing 32 of the exhaust gas recirculation valve 30 so as to flow coolant of the coolant circuit 70 in the passage.

The direction in which the warming passage 36 is extended and the location of the warming passage 36 inside the housing 32 are not limited to the embodiment. That is, only part of the warming passage 36 may be equally spaced from the valve passage 34 and extend in the same direction as the valve passage 34. Alternatively, the warming passage 36 may entirely extend in a direction that is totally different from the valve passage 34. There may be other members, recesses, or spaces between the warming passage 36 and the valve passage 34. The warming passage 36 may be arranged outside the location between the valve passage 34 and the drive mechanism 46. That is, the warming passage 36 may be located and extended in any direction as long as the warming passage 36 is defined inside the housing 32 of the exhaust gas recirculation valve 30. As long as the warming passage 36 is defined inside the housing 32 of the exhaust gas recirculation valve 30, the warming passage 36 warms the housing 32 with exhaust gas and warms the valve passage 34 with the heat of the exhaust gas. Accordingly, the exhaust gas recirculation valve 30 is warmed.

In step S10 of the valve control process, the opening degree at which the exhaust throttle 16 is controlled is not limited to preset opening degree P. In step S10 of the valve control process, the exhaust throttle 16 may be controlled to the fully closed state. In this case, if the branch passage 50 has a passage cross-sectional area that is appropriately large, resistance to piston operation will not be great. Further, depending on the structure of the exhaust throttle 16, the exhaust passage 14 may have some area in the passage even when the exhaust throttle 16 is in the fully closed state. Such an exhaust throttle 16 is less likely to have drawbacks caused by controlling the exhaust throttle 16 in the fully closed state.

In step S10, the exhaust throttle 16 may be controlled to the fully open state. Even in this case, not a little amount of exhaust gas flows into the branch passage 50. This warms the exhaust gas recirculation valve 30.

In step S10, the exhaust gas recirculation valve 30 may be controlled to an opening degree that is greater than the fully closed state. Specifically, the opening degree of the exhaust gas recirculation valve 30 may be slightly greater than the fully closed state to flow exhaust gas into the branch passage 50 while recirculating exhaust gas of an amount that does not cause a problem of condensation to the intake passage 13 so that the exhaust gas recirculation valve 30 is warmed.

The upstream branch passage 51 may extend from a portion of the exhaust passage 14 that is upstream of the exhaust throttle 16 instead of the exhaust gas recirculation passage 20. Even in this case, exhaust gas is introduced to the warming passage 36 in accordance with a difference in gas pressure between portions of the exhaust passage 14 that are upstream and downstream of the exhaust throttle 16.

The valve member arranged in the exhaust passage 14 is not limited to the exhaust throttle 16. The valve member only needs to adjust the flow rate of exhaust gas flowing in the exhaust passage 14. The valve member may be of a type that merely fully opens or fully closes the exhaust passage 14 or a type that changes the opening degree between the fully open state and the fully closed state. However, for preset opening degree P, the valve member is preferably of the type that changes the opening degree between the fully open state and the fully closed state. The valve member may be a poppet valve such as the exhaust gas recirculation valve 30 or a globe valve.

The materials of the upstream branch passage 51 and the downstream branch passage 52 are not limited to stainless steel. The materials of the upstream branch passage 51 and the downstream branch passage 52 are preferably resistant to corrosion.

The material of the housing is not limited to stainless steel. The material of the housing is preferably resistant to corrosion.

The method of calculating the temperature of the exhaust gas recirculation valve 30 is not limited to the embodiment. A temperature sensor may be attached to the exhaust gas recirculation valve 30 to directly detect the temperature of the exhaust gas recirculation valve 30.

The overall structure of the internal combustion engine 10 in the embodiment is only a schematic example. The number of cylinders 12, for example, is not limited to three.

The electronic control unit 100 is not limited to a device that includes a CPU and a memory and executes software processing. For example, at least part of the processes executed by the software in the above-described embodiment may be executed by hardware circuits dedicated to execution of these processes (such as ASIC). That is, the electronic control unit 100 may be modified to have any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust gas recirculation valve warming device comprising:
   a valve member arranged in an exhaust passage of an internal combustion engine, wherein the valve member is configured to adjust a flow rate of exhaust gas flowing in the exhaust passage;
an exhaust gas recirculation passage that extends from a portion of the exhaust passage that is upstream of the valve member and is connected to an intake passage of the internal combustion engine, wherein the exhaust gas recirculation passage is configured to recirculate exhaust gas to the intake passage;
an exhaust gas recirculation valve arranged in the exhaust gas recirculation passage, wherein the exhaust gas recirculation valve is configured to adjust a flow rate of exhaust gas flowing in the exhaust gas recirculation passage; and
a branch passage that extends from a portion of the exhaust passage that is upstream of the valve member or a portion of the exhaust gas recirculation passage that is upstream of the exhaust gas recirculation valve in a direction in which exhaust gas flows, wherein the branch passage is connected to a portion of the exhaust passage that is downstream of the valve member,
wherein the exhaust gas recirculation valve includes a valve passage that forms part of the exhaust gas recirculation passage and a warming passage that forms part of the branch passage.

2. The exhaust gas recirculation valve warming device according to claim 1, comprising a valve controller configured to selectively control opening and closing of the exhaust gas recirculation valve, wherein the valve controller controls the exhaust gas recirculation valve to a fully closed state after the internal combustion engine is started until a temperature of the exhaust gas recirculation valve reaches a preset temperature.

3. The exhaust gas recirculation valve warming device according to claim 2, wherein
the valve controller is configured to selectively control opening and closing of the valve member, wherein the valve controller controls the valve member at an opening degree that is less than an opening degree in a fully open state after the internal combustion engine is started until the temperature of the exhaust gas recirculation valve reaches the preset temperature.

4. The exhaust gas recirculation valve warming device according to claim 3, wherein the valve controller controls the valve member at an opening degree that is greater than an opening degree in a fully closed state after the internal combustion engine is started until the temperature of the exhaust gas recirculation valve reaches the preset temperature.

5. The exhaust gas recirculation valve warming device according to claim 1, wherein at least part of the warming passage is equally spaced from the valve passage and extends in a same direction as the valve passage.

6. The exhaust gas recirculation valve warming device according to claim 2, wherein
a portion of the branch passage that is upstream of the exhaust gas recirculation valve is connected to a first coolant passage in which coolant flows,
a portion of the branch passage that is downstream of the exhaust gas recirculation valve is connected to a second coolant passage in which coolant flows,
a first three-way valve is arranged at a location where the branch passage and the first coolant passage are connected to each other, and
a second three-way valve is arranged at a location where the branch passage and the second coolant passage are connected to each other.

7. The exhaust gas recirculation valve warming device according to claim 6, the exhaust gas recirculation valve warming device comprising a three-way valve controller that controls the first three-way valve and the second three-way valve, wherein
the three-way valve controller is configured to, after the internal combustion engine is started until the temperature of the exhaust gas recirculation valve reaches the preset temperature, control the first three-way valve to block a flow of coolant between the first coolant passage and the branch passage, and control the second three-way valve to block a flow of coolant between the second coolant passage and the branch passage, and
the three-way valve controller is configured to, when the temperature of the exhaust gas recirculation valve exceeds the preset temperature, control the first three-way valve to allow a flow of coolant between the first coolant passage and a portion of the branch passage that extends to the exhaust gas recirculation valve from the first three-way valve, and control the second three-way valve to allow a flow of coolant between the second coolant passage and a portion of the branch passage that extends to the exhaust gas recirculation valve from the second three-way valve.

* * * * *